United States Patent
Al-Ali et al.

(10) Patent No.: US 12,447,324 B2
(45) Date of Patent: Oct. 21, 2025

(54) HEMOSTASIS VALVE SEAL

(71) Applicant: Cygnus Medical LLC, Akron, OH (US)

(72) Inventors: Firas Al-Ali, Hudson, OH (US); Jeff Christian, Morgan Hill, CA (US)

(73) Assignee: Cygnusmed, Inc., Akron, OH (US)

( * ) Notice: Subject to any disclaimer, the term of this patent is extended or adjusted under 35 U.S.C. 154(b) by 893 days.

(21) Appl. No.: 17/575,780

(22) Filed: Jan. 14, 2022

(65) Prior Publication Data

US 2022/0168554 A1 Jun. 2, 2022

Related U.S. Application Data

(63) Continuation-in-part of application No. 16/784,735, filed on Feb. 7, 2020, now Pat. No. 11,376,408, which
(Continued)

(51) Int. Cl.
*A61M 39/06* (2006.01)

(52) U.S. Cl.
CPC ... *A61M 39/0606* (2013.01); *A61M 2039/062* (2013.01); *A61M 2039/0653* (2013.01); *A61M 2039/0686* (2013.01)

(58) Field of Classification Search
CPC ............ A61M 39/06; A61M 2039/062; A61M 39/0606; A61M 39/0613; A61M 2039/0653; A61M 2039/0686; A61M 2039/0626; A61M 2039/0633; A61M 2039/064; A61M 2039/0646;
(Continued)

(56) References Cited

U.S. PATENT DOCUMENTS

| 3,865,100 A | 2/1975 | Kanai et al. |
| 4,160,448 A | 7/1979 | Jackson |

(Continued)

FOREIGN PATENT DOCUMENTS

| CA | 2682474 | 7/2008 |
| CA | 2974544 | 12/2016 |

(Continued)

OTHER PUBLICATIONS

Guardian II Hemostasis Valve. Product Brochure (PDF) [online]. Vascular Solutions, Inc., Sep. 2019 [retrieved on Jul. 14, 2020]. Unique identification No. <MC-005917 Rev>. Retrieved from the Internet: <URL: https://www.teleflex.com/usa/en/product-areas/interventional/coronary-interventions/guardian-ii-hemostasis-valve/Guardian-Hemostasis-Valve-Brochure_MC-005917-rO .pdf>.

(Continued)

*Primary Examiner* — Kami A Bosworth
*Assistant Examiner* — Nelson Louis Alvarado, Jr.
(74) *Attorney, Agent, or Firm* — Dominic A. Frisina; Buckingham, Doolittle & Burroughs, LLC

(57) ABSTRACT

A seal for a hemostasis valve is provided as well as a novel seal stack for use in hemostasis valves. The seal stack includes a plurality of conical or frustoconical members including an anti-prolapse member, and a sealing member. The seal stack may optionally include a diaphragm and/or a second sealing member. The valve body may include a pressure sensing member which may be located in a side-arm.

13 Claims, 9 Drawing Sheets

Related U.S. Application Data is a continuation-in-part of application No. 15/782,664, filed on Oct. 12, 2017, now Pat. No. 10,625,067.

(60) Provisional application No. 63/187,074, filed on May 11, 2021, provisional application No. 62/407,258, filed on Oct. 12, 2016.

(58) Field of Classification Search
CPC .. A61M 2039/2426; A61M 2039/2473; A61M 2039/0673
USPC ........................................................ 604/537
See application file for complete search history.

(56) References Cited

U.S. PATENT DOCUMENTS

| | | | |
|---|---|---|---|
| 4,334,160 A | 6/1982 | McCarty | |
| 4,407,298 A | 10/1983 | Lentz et al. | |
| 4,545,389 A | 10/1985 | Schaberg et al. | |
| 4,587,975 A | 5/1986 | Salo et al. | |
| 4,842,591 A | 6/1989 | Luther | |
| 5,000,745 A * | 3/1991 | Guest | A61M 39/0606 |
| | | | 604/167.04 |
| 5,256,149 A | 10/1993 | Banik et al. | |
| 5,342,315 A | 8/1994 | Rowe et al. | |
| 5,358,490 A | 10/1994 | Henry et al. | |
| 5,383,896 A | 1/1995 | Gershony et al. | |
| 5,626,601 A | 5/1997 | Gershony et al. | |
| 5,868,778 A | 2/1999 | Gershony et al. | |
| 5,911,710 A * | 6/1999 | Barry | A61M 39/0693 |
| | | | 604/167.04 |
| 5,951,583 A | 9/1999 | Jensen et al. | |
| 5,957,952 A | 9/1999 | Gershony et al. | |
| 6,017,359 A | 1/2000 | Gershony et al. | |
| 6,033,366 A | 3/2000 | Brockway et al. | |
| 6,083,207 A | 7/2000 | Heck | |
| 6,287,280 B1 | 9/2001 | Lampropoulos et al. | |
| 6,296,658 B1 | 10/2001 | Gershony et al. | |
| 6,331,176 B1 | 12/2001 | Becker et al. | |
| 6,511,434 B1 | 1/2003 | Haytman et al. | |
| 6,551,283 B1 | 4/2003 | Guo et al. | |
| 6,575,960 B2 | 6/2003 | Becker et al. | |
| 6,695,820 B1 | 2/2004 | Armstrong et al. | |
| 6,709,418 B1 * | 3/2004 | Aboul-Hosn | A61M 1/3667 |
| | | | 604/167.03 |
| 6,896,002 B2 | 5/2005 | Hart et al. | |
| 7,347,822 B2 | 3/2008 | Brockway et al. | |
| 7,938,809 B2 | 5/2011 | Lampropouslos et al. | |
| 7,976,503 B2 | 7/2011 | Khan et al. | |
| 8,048,032 B2 | 11/2011 | Root et al. | |
| 8,142,413 B2 | 3/2012 | Root et al. | |
| 8,246,585 B2 | 8/2012 | Schennib | |
| 8,292,850 B2 | 10/2012 | Root et al. | |
| 8,852,147 B2 | 10/2014 | Callan et al. | |
| RE45,380 E | 2/2015 | Root et al. | |
| RE45,760 E | 10/2015 | Root et al. | |
| RE45,776 E | 10/2015 | Root et al. | |
| RE46,116 E | 8/2016 | Root et al. | |
| 9,675,792 B2 | 6/2017 | Bramwell et al. | |
| 9,895,524 B2 | 2/2018 | Lareau | |
| 2001/0049499 A1* | 12/2001 | Lui | A61M 39/06 |
| | | | 604/167.04 |
| 2003/0191460 A1* | 10/2003 | Hobbs | A61B 18/245 |
| | | | 606/7 |
| 2004/0243044 A1 | 12/2004 | Penegor et al. | |
| 2005/0010238 A1* | 1/2005 | Potter | A61M 39/0606 |
| | | | 606/129 |
| 2005/0096605 A1 | 5/2005 | Green et al. | |
| 2007/0038143 A1 | 2/2007 | Root et al. | |
| 2008/0171988 A1* | 7/2008 | Blanco | A61B 17/3498 |
| | | | 604/167.03 |
| 2008/0243081 A1 | 10/2008 | Nance et al. | |
| 2009/0204078 A1 | 8/2009 | Mitchell et al. | |
| 2009/0318881 A1 | 12/2009 | Shennib | |
| 2010/0324567 A1 | 12/2010 | Root et al. | |
| 2012/0165756 A1 | 6/2012 | Root et al. | |
| 2016/0066932 A1 | 3/2016 | Root et al. | |
| 2016/0346515 A1 | 12/2016 | Buller et al. | |
| 2017/0050003 A1 | 2/2017 | Root et al. | |
| 2018/0064453 A1 | 3/2018 | Garrison et al. | |

FOREIGN PATENT DOCUMENTS

| | | |
|---|---|---|
| WO | 2016040579 | 3/2016 |
| WO | 2016191415 | 12/2016 |

OTHER PUBLICATIONS

SafeSheath Sealing Adapter. Product Sheet (PDF) [online]. Pressure Products Medical Supplies, Inc. [retrieved on Jul. 14, 2020]. Retrieved from the Internet: <URL: http://www.pressure-products.com/Downloads/PS/SA_PS.pdf>.

Sense-IT (DIPT). Product Literature (PDF) [online]. Eleam Medical, Oct. 2018 [retrieved on Jul. 14, 2020]. Unique Identification No. <REV-7 10/2018 ISO 13485>. Retrieved from the Internet: <URL: https://www.elcam-medical.com/sites/elcam/UserContent/files/Sense-IT_DIPT_ENG_REV7_10-2018.pdf>.

Y-Click. Product Literature (PDF) [online]. Eleam Medical, Oct. 2018 [retrieved on Jul. 14, 2020]. Unique dentification No. <REV-6 10/2018 ISO 13485>. Retrieved from the Internet: <URL: https://www.elcam-medical.com/sites/elcam/UserContent/files/Y-Click_REV6_10-2018_v4.pdf>.

* cited by examiner

HEMOSTASIS VALVE SEAL

This application incorporates by reference in their entireties U.S. patent application Ser. No. 16/784,735 filed on Feb. 7, 2020, U.S. patent application Ser. No. 15/782,664 filed on Oct. 12, 2017, U.S. patent application Ser. No. 62/407,258 filed Oct. 12, 2016, and U.S. patent application Ser. No. 63/187,074.

I. BACKGROUND OF THE INVENTION

A. Field of Invention

The invention generally relates to the field of hemostasis valves.

B. Description of the Related Art

Bleed-back control valves are well-known and have long been in use in surgical intervention and diagnostic procedures involving catheters. Bleed-back control valves are alternatively known as backflow control valves and hemostasis valves. One common bleed-back control valve is the Tuohy-Borst adapter. In general terms, a catheter is fed into the adapter through an upstream (distal) catheter access port, it travels through the lumen of the adapter, and exits through another port at the downstream (proximal) end, thus entering the patient.

Tuohy-Borst adapters include a threaded fitting containing a compressible cylindrical gasket. As the gasket is axially compressed by the fitting it collapses around the catheter locking it in place and preventing blood or other fluids from backflowing through the catheter access port. The typical mode of using a Tuohy-Borst adapter is to feed a catheter through the adapter to position it within a patient. Once positioned, the catheter is locked in place.

The Tuohy-Borst adapter is a very common tool in the medical profession even to the extent of being a standard; however, this tool has certain shortcomings. For instance, bleed-back can only be stopped when the catheter is locked in place. Therefore, as the physician is positioning the catheter within a patient, blood will backflow to some extent. This creates a blood spill, which is undesirable because it increases the risk of exposure to blood-borne pathogens, and because blood loss can have negative consequences for the patient. Generally, the physician will loosen the catheter just enough to allow the catheter to slide. This tends to limit bleed-back, but it does not eliminate it.

What is needed is a bleed-back control valve that slideably engages a catheter while simultaneously blocking bleed-back. Some embodiments of the present invention may provide one or more benefits or advantages over the prior art.

II. SUMMARY OF THE INVENTION

Some embodiments may relate to a seal for a hemostasis valve comprising, an anti-prolapse member comprising a rigid frustoconical structure having an annular base flange and a central through-hole; a first sealing member comprising a flexible conical structure having an annular base flange, a blunted apex axially aligned with the through-hole of the anti-prolapse member, a seam oriented through the blunted apex, a first registering structure at a first position on an upstream face of the base flange, and a second registering structure complementary to the first registering structure and positioned on a downstream face of the base flange at an angular offset of $\varphi$ relative to the first registering structure, wherein $\varphi$ is an angle between 10o and 90o, wherein an upstream face of the first sealing member receives a downstream face of the anti-prolapse member; and a second sealing member comprising a flexible conical structure having an annular base flange, a blunted apex axially aligned with the through-hole of the anti-prolapse member, a seam oriented through the blunted apex, a first registering structure at a first position on an upstream face of the base flange, and a second registering structure complementary to the first registering structure and positioned on a downstream face of the base flange at an angular offset of $\varphi$ relative to the first registering structure, wherein $\varphi$ is an angle between 10o and 90o, wherein an upstream face of the second sealing member receives a downstream face of the first sealing member, and wherein the second sealing member is oriented at an angular offset of $\varphi$ relative to the first sealing member.

Some embodiments may relate to a seal for a hemostasis valve comprising, an anti-prolapse member comprising a rigid frustoconical structure having an annular base flange and a central through-hole; a diaphragm, that is flexible and frustoconical, having an annular base flange and a central through-hole, wherein a downstream face of the diaphragm is received by an upstream face of the anti-prolapse member; and a sealing member comprising a flexible conical structure having an annular base flange, a blunted apex axially aligned with the through-hole of the anti-prolapse member, a seam oriented through the blunted apex, wherein an upstream face of the first sealing member receives a downstream face of the anti-prolapse member.

Some embodiment may relate to a hemostasis valve, comprising a valve body comprising an inner luminal wall extending from an upstream opening to a downstream opening; a seal stack comprising: an anti-prolapse member comprising a rigid frustoconical structure having an annular base flange and a central through-hole; a sealing member comprising a flexible conical structure having an annular base flange, a blunted apex axially aligned with the through-hole of the anti-prolapse member, a seam oriented through the blunted apex, wherein an upstream face of the first sealing member receives a downstream face of the anti-prolapse member; a mounting groove in the inner luminal wall sized to simultaneously receive the base flanges of the seal stack in a mounted relation; and a frustoconical valve seat supportively receiving a downstream face of the seal stack, the frustoconical valve seat defining an orifice in fluid communication with a space defined by the inner luminal wall of the valve body, wherein blunted apex of the seal stack protrudes through the orifice.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof, wherein like reference numerals indicate like structure, and wherein.

IV. DETAILED DESCRIPTION OF THE INVENTION

As used herein the terms "embodiment", "embodiments", "some embodiments", "other embodiments" and so on are not exclusive of one another. Except where there is an explicit statement to the contrary, all descriptions of the features and elements of the various embodiments disclosed herein may be combined in all operable combinations thereof.

Language used herein to describe process steps may include words such as "then" which suggest an order of operations; however, one skilled in the art will appreciate that the use of such terms is often a matter of convenience and does not necessarily limit the process being described to a particular order of steps.

Conjunctions and combinations of conjunctions (e.g. "and/or") are used herein when reciting elements and characteristics of embodiments; however, unless specifically stated to the contrary or required by context, "and", "or" and "and/or" are interchangeable and do not necessarily require every element of a list or only one element of a list to the exclusion of others.

Terms of degree, terms of approximation, and/or subjective terms may be used herein to describe certain features or elements of the invention. In each case sufficient disclosure is provided to inform the person having ordinary skill in the art in accordance with the written description requirement and the definiteness requirement of 35 U.S.C. 112.

The terms upstream and downstream are used herein to indicate the relative position or orientation of parts of an embodiment in an assembled state, and/or while in use. Their meaning will be clear in context to the ordinarily skilled artisan, but in general they refer to the direction of travel of a catheter as it is inserted into an embodiment.

Figure 1A:
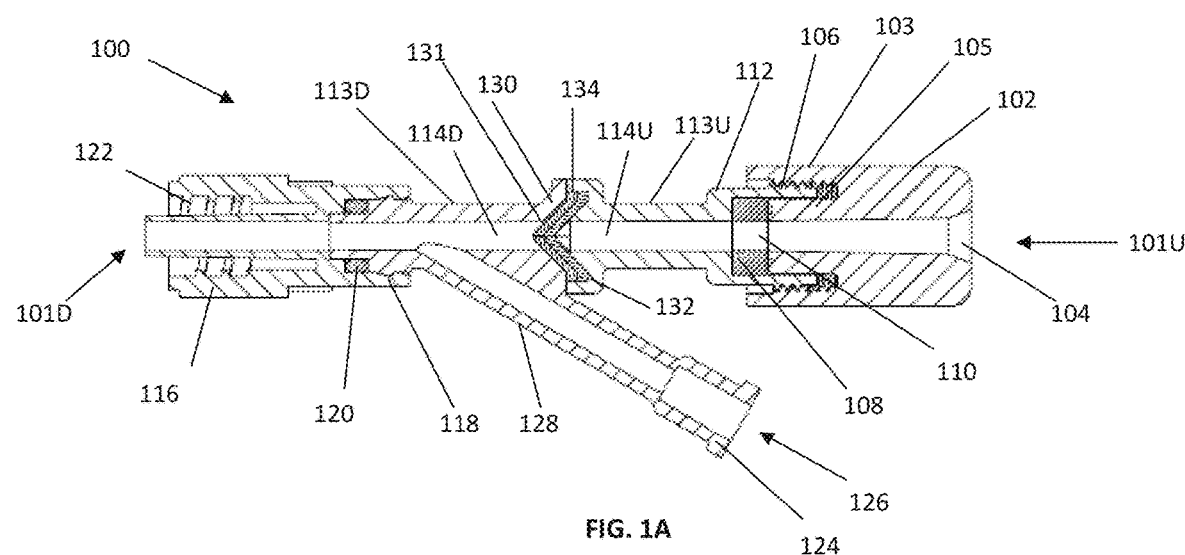
FIG. 1A is a cross sectional view of a valve according to an embodiment of the invention.

Referring now to the drawings wherein the showings are for purposes of illustrating embodiments of the invention only and not for purposes of limiting the same, FIG. 1A is a cross sectional view of an embodiment 100 of the invention comprising a fully assembled bleed-back control valve, also known in the art as a hemostasis valve. The upstream end 101U is shown to the right, and the downstream end 101D is on the left. The upstream end 101U includes a chamfered, or beveled, catheter access port 104 formed in a compression nut 102. The nut 102 has female threads 103 downstream of the access port 104. The nut also includes a plunger 105 that functions to axially compress a cylindrical gasket 108 as the nut 102 is tightened onto a male thread 106 of an upstream portion of the valve body 113U. The cylindrical seal is compressed between the plunger 105 and a seat 112 formed in the valve body 113U. A central through-hole 110 of the cylindrical seal 108 is aligned coaxially with the lumen 114U, 114D which is defined by an inner luminal wall of the valve body 113U, 113D. Thus, a catheter may enter through the access port 104, pass through the through-hole 110, enter the lumen 114U, 114D and exit the valve body at the downstream end 101D of the bleed-back control valve. The central through-hole 110 is sized to slideably receive the catheter in an uncompressed state. In this context, the term slideably receive means that the catheter is free to travel through the central through hole 110 regardless of whether the catheter actually makes sliding contact with the sides of the through-hole 110.

The valve body is divided into two halves, namely an upstream half 113U and a downstream half 113D. The reason for dividing the valve body in this way is to provide structure for easily installing a seal such as, and without limitation, conical seal stack 134, into a mounting groove 132 formed by the two halves. While the present embodiment is divided into two halves, the skilled artisan will readily understand that any of a wide variety of known structures for retaining a seal would also be appropriate as a matter of design choice. Such variations are well within the scope of the present invention as described and claimed herein. FIG. 1A shows a conical seal 134 comprising two seal members held in a mounted relation by the mounting groove 132. Embodiments are not limited to two-member seal stacks. Rather, conical seal stacks within the scope of the invention may three members or four members, as will be described in more detail herein.

In the embodiment of FIG. 1A, the groove 132 holding the double conical seal 134 has a complex frustoconical-shaped wall 130 formed in the upstream and downstream halves of the valve body 113U, 113D. The frustoconical wall 130 formed in the upstream and downstream halves of the valve body 113U, 113D serves as a valve seat. Thus, the frustoconical wall 130 may also be referred to herein as a frustoconical valve seat 130. In addition to holding the double conical seal 134 in place, the frustoconical shape also tends to support a portion of the seal 134 while allowing the apex of the seal to protrude through an orifice 131 and into the downstream lumen 114D. This arrangement may be advantageous by, for instance and without limitation, limiting the amount of flexure that the seal experiences during insertion of a catheter and/or providing improved sealing around a catheter by stiffening the seal and thereby increasing sealing force.

With continued reference to FIG. 1A, the downstream valve body 113D terminates in a rotatable collar fitting comprising an annular ridge and groove connection 118 to a standard Luer Lock fitting 116 threaded 122 to fixedly cooperate with cannulas. By fixedly cooperate, it is contemplated that the threads of the Luer Lock fitting may receive a cannula having complementary structure in a fastened and thus fixed relation relative to the Luer Lock fitting. The fitting 116 is sealed with an O-ring 120 to prevent leakage of fluids from the lumen 114D, 114U. Some embodiments, including the one shown in FIG. 1A, may include a sidearm flush 128 with a port 124 co-operable with standard fluid delivery devices such as syringes. The lumen 126 of the sidearm flush is shown in fluid communication with the downstream lumen 114D of the downstream valve body 113D.

Figure 1B:
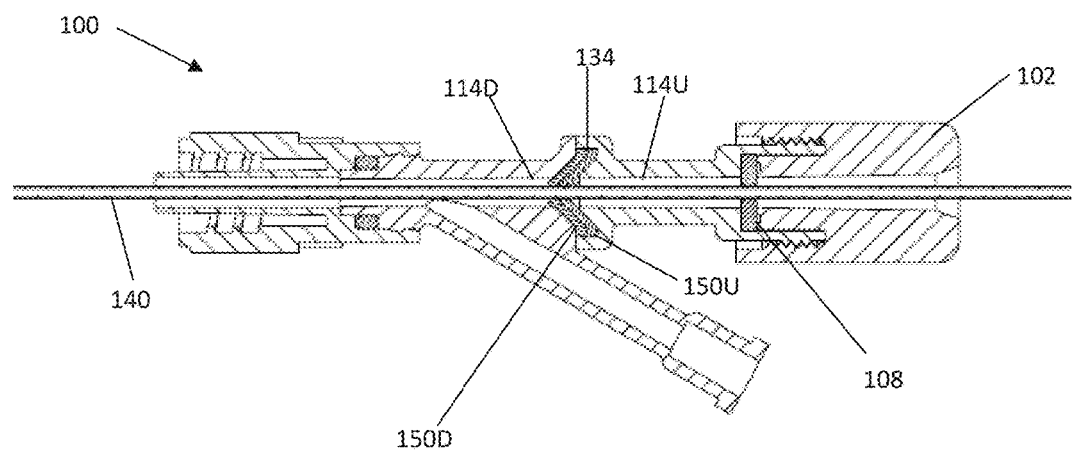
FIG. 1B is a cross sectional view of the valve of FIG. 1A receiving a catheter.

In contrast to FIG. 1A, FIG. 1B illustrates the same embodiment 100 receiving a catheter 140. The catheter is shown locked in place by the cylindrical seal 108 which has been compressed by tightening the nut 102. Accordingly, the seal 108 has collapsed around the catheter 140 and thus locks it in place through friction. FIG. 1B also illustrates the upstream conical gasket 150U and the downstream conical gasket 150D of the double conical seal 134 opening at their apexes to receive the catheter 140. The gaskets 150U, 150D dynamically seal against the catheter 140 as it is inserted into the embodiment 100 and fed into a patient. The gaskets 150U, 150D then statically maintain the seal when the catheter 140 is locked in place, as shown here.

Figure 2:
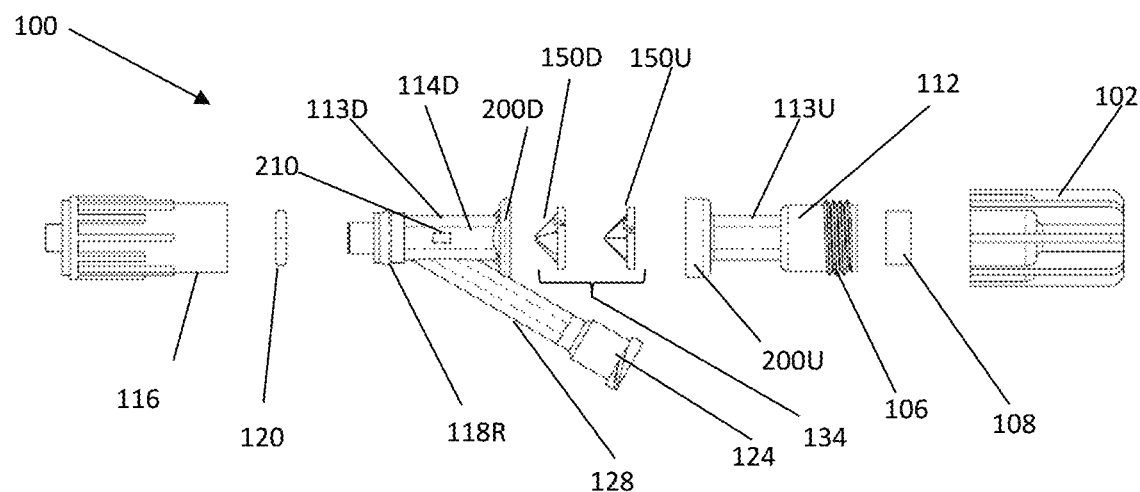
FIG. 2 is an exploded view of the valve of FIGS. 1A and 1B.

FIG. 2 is an exploded view of the embodiment shown in FIGS. 1A and 1B. The valve body is shown divided into its upstream 113U and downstream 113D halves. The upstream valve body 113U includes a seat 112 receiving a cylindrical seal 108. A nut 102 is threaded onto the male thread 106 of the upstream valve body 103U, which compresses the cylindrical seal 108 with a plunger 105 (see FIG. 1A). Interposed between the two halves of the valve body 113U, 113D are two conical gaskets 150U, 150D. One is an upstream conical gasket 150U and the other is a downstream conical gasket 150D. The base of the upstream gasket 150U fits into a seat 200 at one end of the upstream valve body 113U. The two gaskets 150U, 150D stack one within the other, and their angular orientation relative to each other is set by registering structures, as will be described in more detail below.

The conical gaskets 150U, 150D are mounted between an upstream flange 200U and a downstream flange 200D. The upstream and downstream flanges 200U, 200D include the frustoconical wall 130 and groove 132 which are not visible in this figure, but which can be seen in FIG. 1A. The downstream end of the downstream valve body 113D terminates in a ridge 118R of the ridge and groove connection 118 shown in FIG. 1A. The ridge 118R receives the Luer Lock collar fitting 116 in a rotatable relation sealed with an O-ring 120.

A pressure transducer 210 is shown mounted within the lumen 114D of the downstream valve body 113D. The transducer advantageously has a thin profile which allows it to be in the lumen without occluding or obstructing. Thus, the transducer cooperates with a catheter 140 in that it does not obstruct its path. Accordingly, the transducer is capable of obtaining real time measurements of body fluid pressures while carrying out a procedure without the need for additional fluidics, and without the need to pause the procedure to measure pressure. Suitable pressure transducers are well known in the art and may be selected as a matter of design choice. Optionally, the transducer 210 may include or communicate with electronic components for wirelessly broadcasting telemetry data. The skilled artisan will appreciate that the placement of the transducer 210 is advantageously within the downstream lumen 114D because the upstream lumen 114U is isolated by the conical seal 134.

FIGS. 3A through 3E illustrate the same conical gasket 150 in various orientations. The embodiment illustrated in FIGS. 1-2 illustrate a double conical seal 134 which is made of a stacked pair of this conical gasket 150 which, in FIGS. 1-2, are labeled upstream 150U and downstream 150D. Their unique reference numbers 150U and 150D are intended only to indicate their position in the assembled device. In the some embodiments illustrated herein, the upstream and downstream conical gaskets are structurally identical to each other and to the gasket illustrated in FIGS. 3A-3E. The skilled artisan will readily appreciate that being identical is not a requirement, but that certain manufacturing efficiencies are gained by having two of a single part rather than two different parts. Furthermore, other embodiments are provided herein that include conical seal stacks of three or four members, as will be described herein.

Figure 3A:
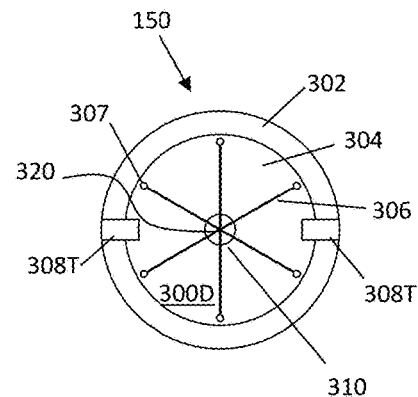
FIG. 3A is a top view of a conical gasket according to an embodiment of the invention.
Figure 3B:
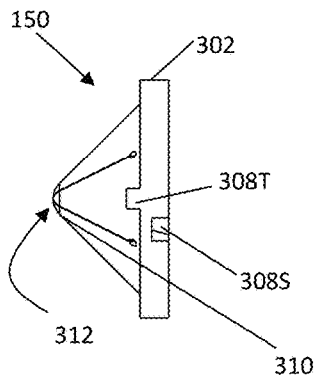
FIG. 3B is a side view of the conical gasket of FIG. A.
Figure 3C:
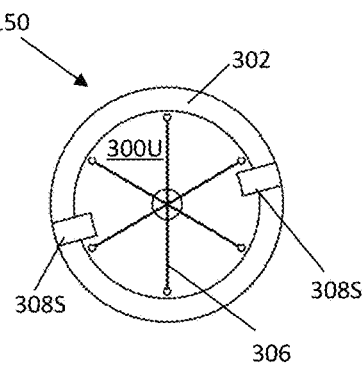
FIG. 3C is a bottom view of the conical gasket of FIG. A.
Figure 3D:
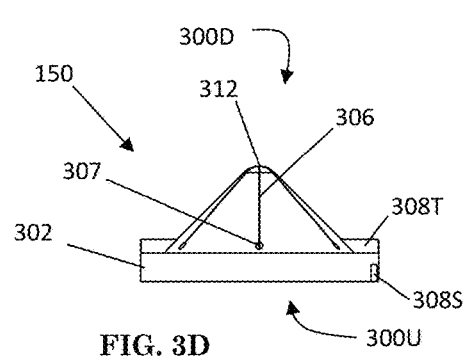
FIG. 3D is a second side view of the conical gasket of FIG. A.
Figure 3E:
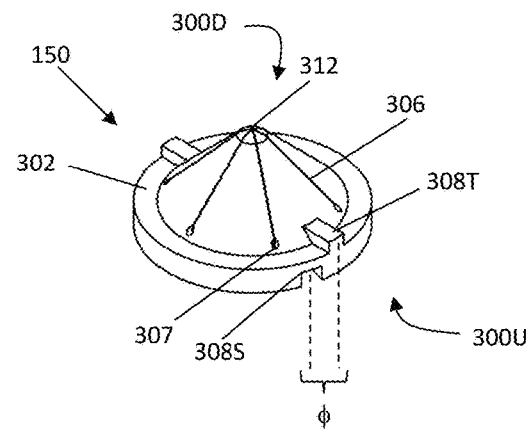
FIG. 3E is an elevation view of the conical gasket of FIG. A.
Figure 3F:
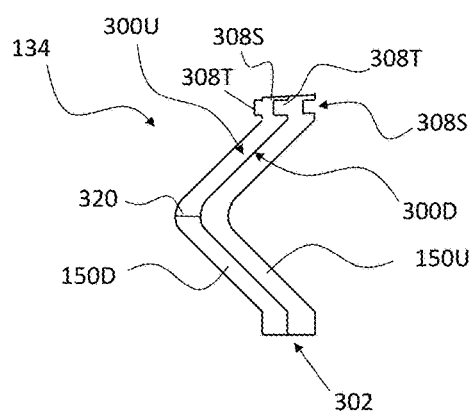
FIG. 3F is a cross sectional view of a double conical seal combining two conical gaskets.

With collective reference to FIGS. 3A-3E a conical gasket 150 is shown that has an annular base flange 302. The base flange 302 cooperates with the groove defined in the upstream and downstream flanges 200U, 200D of FIG. 2. The upstream surface of a conical wall 300U and the downstream surface of the same wall 300D are shown divided into six equal semi-conical flaps 304 through the apex 312. The edges of each semi-conical flap 304 abut the edges of its nearest neighbors to form seams 306. As used in this context, the term seam is intended only to denote area where flap edges abut one another, and it is not intended to imply that the edges are joined. To the contrary, the edges are not joined, and thus the flaps 304 can spread apart in response to an impinging catheter to form an opening 320 at the apex 312 where the catheter may pass through. With reference to FIG. 3F, it is noted that seam 306 is visible in the leftmost seal member, but not the rightmost seal member. This reflects the fact that seam of the rightmost seal member is angularly offset from that of the leftmost member and therefore is not visible in cross-section.

The circle 310 is not a structural element of the conical gasket 150. Rather, it is intended to indicate the region where the conical wall 300U, 300D begins to curve to form the blunted apex 312 shown most clearly in FIGS. 3B, 3D, and 3E. As used herein, the term apex, or blunted apex, is intended to indicate the point of sharpest curvature of the seal 150 structure.

Each seam 306 terminates in a circular through-hole 307 near the base flange 302. This structure is optional, but may be advantageous in preventing tearing of the gasket at the seam terminuses. The gasket 150 has a pair of register tabs 308T located on the downstream surface 180 degrees apart from each other. Similarly, the illustrated embodiment includes a pair of register sockets 308S located on the upstream surface 180 degrees apart. Thus, a pair of the gasket 150 may be stacked such that the register tabs 308T of one cooperatively fit into, i.e. engage, the sockets 308S of the other. Conversely, the sockets 308S of one gasket 150 may be said to engage the register tabs 308T of the other gasket 150. Register tabs 308T and register sockets 308S are referred to herein according to their genus as register structures, or registering structures. Thus, the angular orientation of the gaskets relative to each other may be fixed.

When FIGS. 1A and 1B are viewed in connection with FIG. 2, it is clear to the person having ordinary skill in the art that the gaskets 150U and 150D are stacked one within the other. Stated differently, the downstream gasket 150D receives the upstream gasket 150U such that their conical walls abut each other. Furthermore, when the conical walls of the upstream 150U and downstream 150D conical gaskets abut, the registering structures of the respective gaskets must engage each other.

The skilled artisan will readily appreciate that the number and distribution of register tabs and register sockets may vary. Embodiments may have only one register tab 308T and one register socket 308S provided that they are positioned to cooperate with the tabs and sockets of other gaskets 150. Alternatively, embodiments may have a plurality of tabs and sockets, and they may be disposed on either the upstream or downstream surface, or even on both surfaces. More important that number and distribution is the relative position of registering structures 308S, 308T on the upstream face as compared to the downstream face such that they produce the desired angular offset between the seams 306 of the respective upstream and downstream gaskets. Upon reading the present disclosure the skilled artisan will understand that some embodiments of the invention do not require registering structures because only one member of the seal stack has seams. Thus, registering structures are not a requirement of all embodiments.

With further regard to FIGS. 3A-3E the register tabs 308T and register sockets 308S of an individual gasket 150 are shown off-set from each other by an angle φ. The precise magnitude of the off-set is not critical; however, it should be sufficient to cause the seams 306 of two or more stacked gaskets 150 to be sufficiently off-set from each other to allow the semi-conical flaps 304 to elastically spread under normal operating conditions, where the embodiment is sealably receiving a catheter, without causing bleed-back of body fluids into the upstream lumen 114U. Suitable magnitudes will depend in part on the number of semi-conical flaps 304, which may be more or fewer than the illustrated number without departing from the scope of the invention. The skilled artisan will appreciate that a greater number of flaps 304 requires more seams 306 which requires smaller angular off-sets. Suitable magnitudes for φ according to the illustrated embodiment include any angle from 1° to 59°. Other ranges within the scope of the invention include 1° to 5°, 5° to 10°, 10° to 15°, 15° to 20°, 20° to 25°, 25° to 30°, 30° to 35°, 35° to 40°, 40° to 45°, 45° to 50°, 50° to 55°, 55° to 59°, or any combination thereof.

With particular regard to FIG. 3F, a cross sectional view of a double conical seal 134 embodiment is shown comprising an upstream conical gasket 150U and a downstream conical gasket 150D. The cross section is taken so as to show the registering socket 308S of the downstream conical gasket 150D receiving, i.e. engaging, the registering tab 308T of the upstream conical gasket 150U. As shown, the upstream conical wall 300U of the downstream conical gasket 150D abuts the downstream conical wall 300D of the upstream conical gasket when the registering structures, namely the registering tab and registering socket, of the respective conical gaskets engage each other. The registering socket 308S and tab 308T are shown as part of the annular base flange 302. This view also shows that the openings 320 of the upstream and downstream conical gaskets 150U, 150D are offset; therefore, one is visible in the cross-section and the other is not.

Figure 4A:
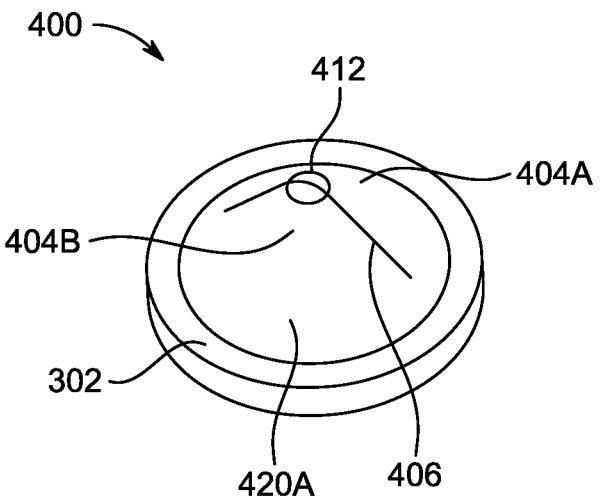
FIG. 4A is a drawing of a single-seam conical gasket.

Turning to FIG. 4A, a conical shaped component 400 is a flexible valve with two flaps 404A, 404B separated by a single seam 406. The seam 406 is shown passing through a blunted apex 412. The valve 400 also includes a base flange 302 which functions as described in relation to FIGS. 3A-3F. While the invention is not limited to material choice, a suitable material is silicone with an approximate hardness of 30-60 Shore A. The valve 400 can also be fabricated from a suitable thermoplastic elastomer, as the person having ordinary skill in the art will be readily able to select as a matter of design choice without undue experimentation. Registering structures are omitted from this valve 400 because it is intended for use with the structures shown in FIGS. 4B and 4C which have no seams and therefore do not require an off-set φ.

Figure 4B:
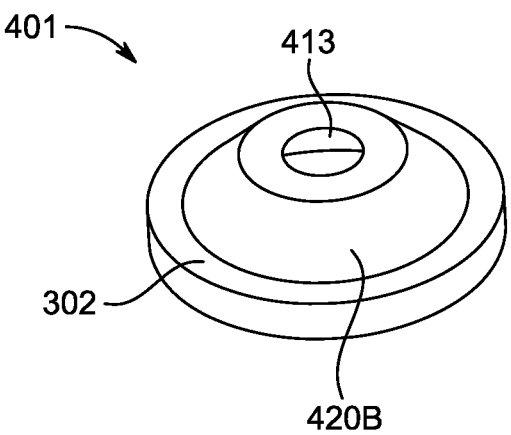
FIG. 4B is a drawing of a annular frustoconical diaphragm.

FIG. 4B is a frustoconical-shaped flexible diaphragm 401 with a hole 413 that seals around a cylindrical member inserted through it, such as a catheter (not shown). While the invention is not limited to material choice, a suitable material is silicone with an approximate hardness of 30-60 Shore A. The diaphragm 401 can also be fabricated from a suitable thermoplastic elastomer, as the person having ordinary skill in the art will be readily able to select as a matter of design choice without undue experimentation.

Figure 4C:
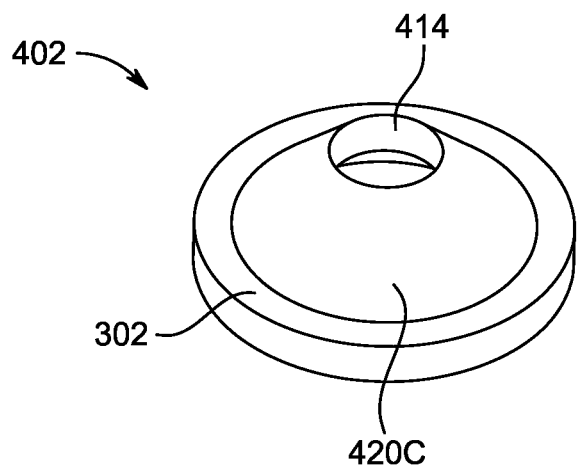
FIG. 4C is a drawing of an annular frustoconical antiprolapse member.

FIG. 4C is a rigid frustoconical component comprising an anti-prolapse member 402. The anti-prolapse member 402 serves to provide structural support to flexible valve 400 and flexible diaphragm 401 thereby preventing prolapse of the valve 400 and/or diaphragm 401, especially during withdrawal of an instrument, such as a catheter. The anti-prolapse member 402 has a central through-hole 414 that is slightly larger in diameter than the diameter of the largest device, e.g. a catheter, that may be inserted through it. The slope of the conical wall 420C of the anti-prolapse member 402 is the same as that of the flexible diaphragm 420B and the valve 420A. Thus, the anti-prolapse member 402, diaphragm 401, and valve 400 are structured to be received in a stacked relation, one inside the other, similar to the double conical seal 134 although, unlike the double conical seal 134, no registering structures are required. While the invention is not limited to material choice, a suitable material is stainless steel or a rigid medical-grade plastic, as are commonly used in medical devices. The person having ordinary skill in the art will be readily able to select a suitable material as a matter of design choice without undue experimentation.

Figure 5A:
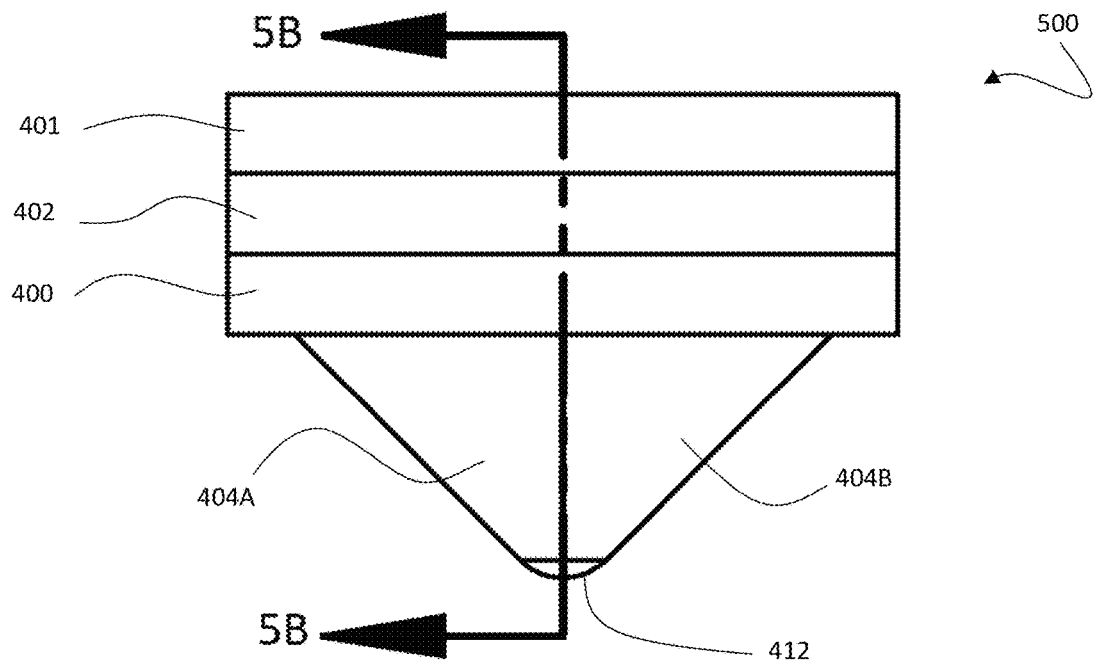
FIG. 5A is a side cross-sectional view of a cooperating stack of the members shown in FIGS. 4A-4C.

FIG. 5A illustrates a three-member seal stack 500 according to one embodiment of the invention. The flexible seal 400 is shown on the bottom of the stack with the blunted apex 412 pointed downward. The seal 400 includes two flaps 404A, 404B separated by a seam. The seam is not visible in this view because it overlays line 5B-5B indicating the cross sectional view shown in FIG. 5B.

Figure 5B:
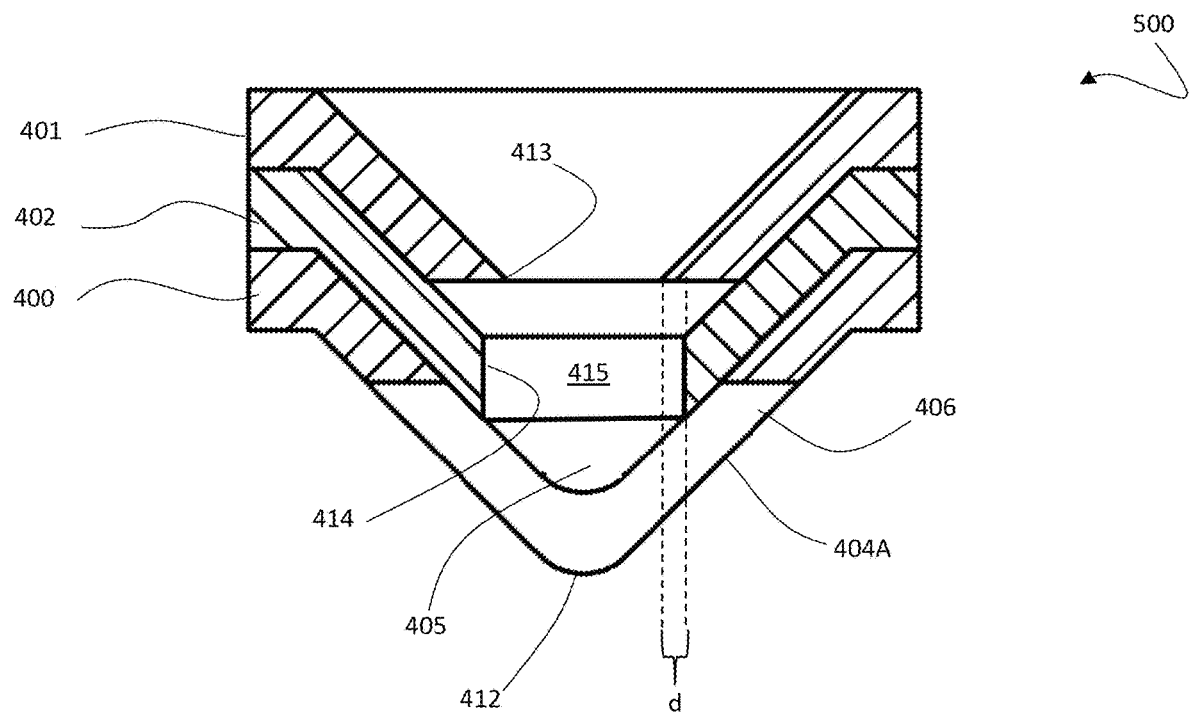
FIG. 5B is a cutaway view of a cooperating stack of the members shown in FIGS. 4A-4C.

Turning to FIG. 5B, the diaphragm 401 is shown at the top of the stack 500 with its central through-hole 413 opening downward. The rigid anti-prolapse member 402 is positioned directly under the diaphragm 401 and directly above the valve 400. The central through-hole 414 of the anti-prolapse member is coaxially positioned relative to the central through-hole 413 of the diaphragm 401. Additionally, the central through-hole 414 of the anti-prolapse member 402 is slightly wider than the central through-hole 413 of the diaphragm 401 by a distance "d". This distance "d" allows for the flexible diaphragm 401 to sealingly receive a device such as a catheter (not shown) that is slightly larger than the central through-hole 413 of the diaphragm 401. Thus, the catheter stretches the central through-hole 413 around its diameter, creating a seal. The central through-hole 414 of the anti-prolapse member 402, being somewhat larger than the central through-hole 413 of the diaphragm 401, slidably receives the catheter while maintaining clearance between the side 415 of the central through-hole 414 and the catheter. As the catheter proceeds downward through the sealing stack 500 it contacts the inside (upstream) surface 405 of the valve 400, separating the flaps 404A and 404B at seam 406 and exiting through the seam 406 in the area of the blunted apex 412. As shown, the faces of the three members 400, 401, and 402 directly contact each other. No registering structures are necessary since only the single valve member 400 has a seam 406.

Figure 6A:
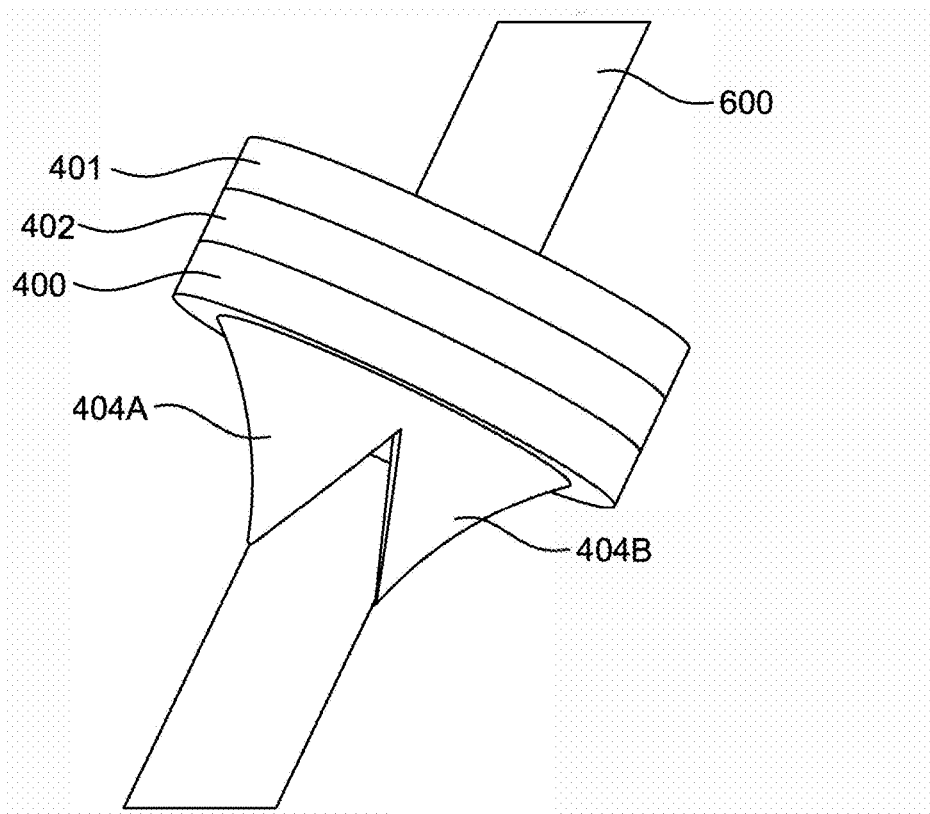
FIG. 6A illustrates the stack of FIGS. 5A-5B receiving a catheter.
Figure 6B:
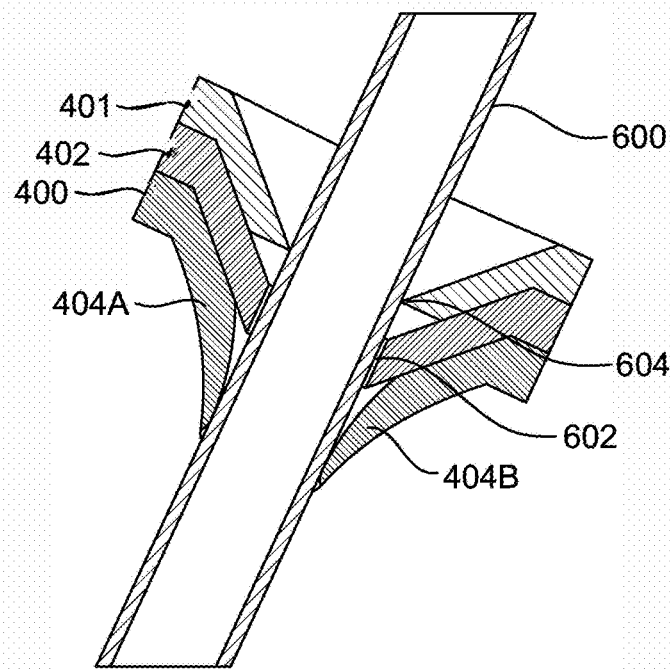
FIG. 6B is a cross-sectional view of the stack of FIGS. 5A-5B receiving a catheter.

FIG. 6A shows the three-member valve stack 500 with a catheter 600 shaft inserted to show how the valve 400 opens, separating the flaps 404A, 404B. FIG. 6B is a cross section of the open valve 400 on the bottom with the diaphragm 401 on top sealing 604 around the catheter 600 shaft when inserted. Clearance 602 is also visible between the catheter 600 and the side 415 of the hole 414 of the anti-prolapse member 402.

Figure 7A:
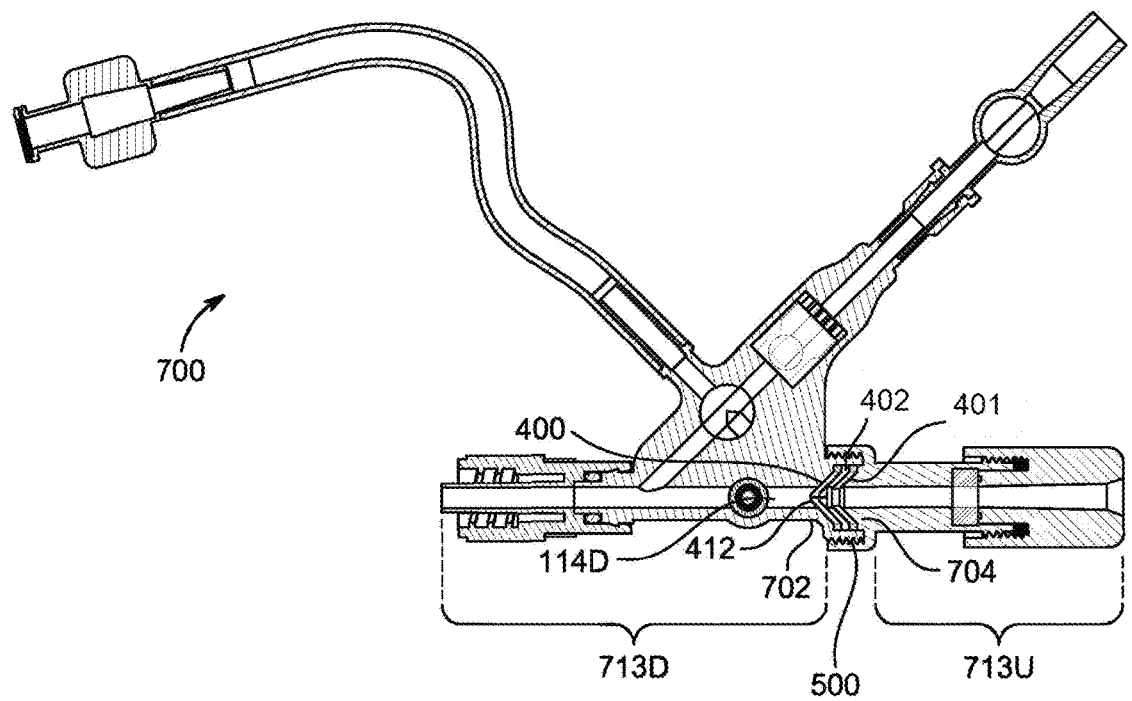
FIG. 7A is a partially transparent view of a hemostasis valve comprising the stack of FIGS. 5A-5B.
Figure 7B:
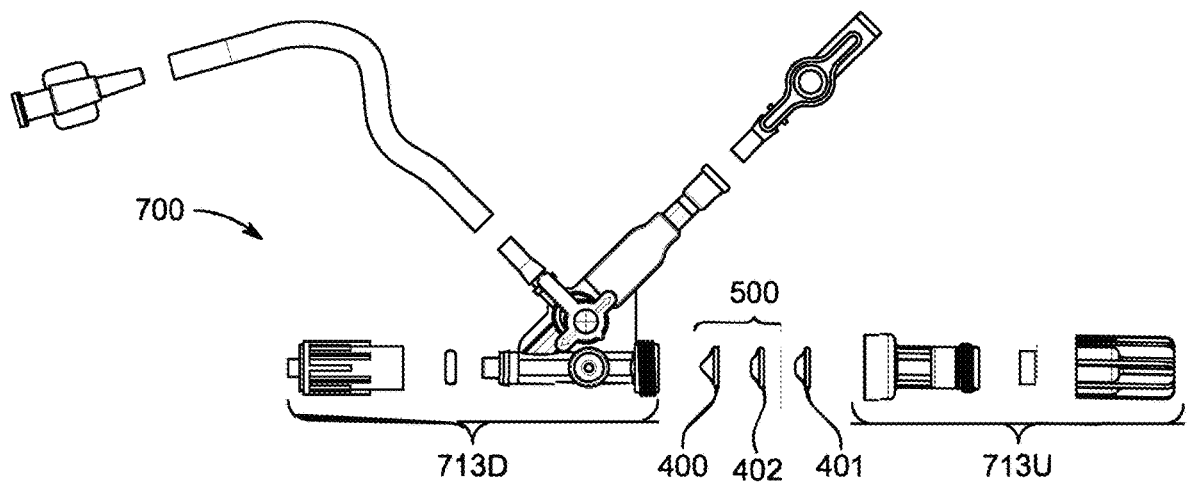
FIG. 7B is an exploded view of a hemostasis valve comprising the stack of FIGS. 5A-5B.

FIGS. 7A and 7B illustrate how the valve stack 500 cooperates with a hemostasis valve 700. Similar to other embodiments described herein, the valve body is divided into upstream and downstream halves 713U, 713D and the flanges 302 (See FIG. 4A-4C) of the valve stack 500 are held in compression between a first frustoconical seat 702 and a second frustoconical seat 704. The blunted apex 412 of the valve 400 protrudes into the downstream lumen 114D.

Figure 8A:
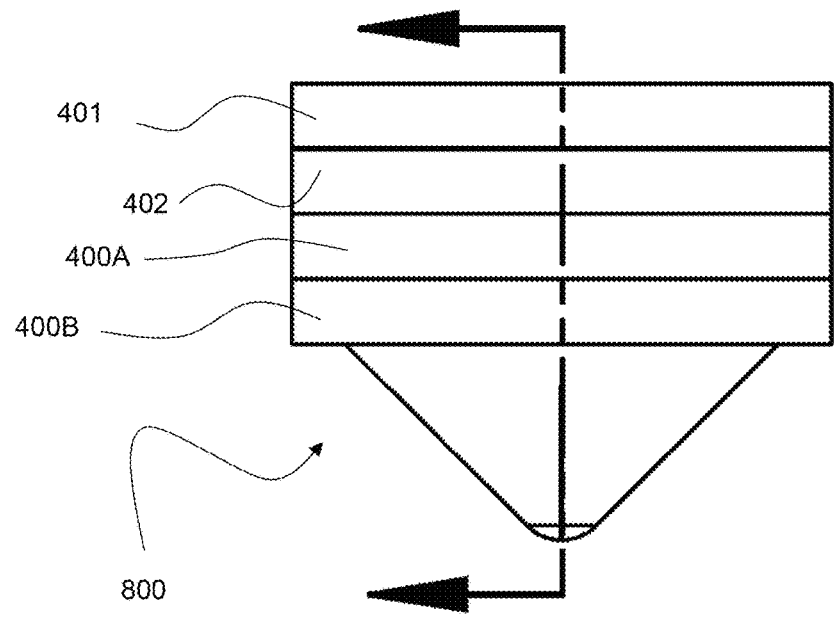
FIG. 8A is a stack similar to that of FIGS. 5A-5B but further includes second single-seam conical gasket offset by 90° from the first single-seam conical gasket.
Figure 8B:
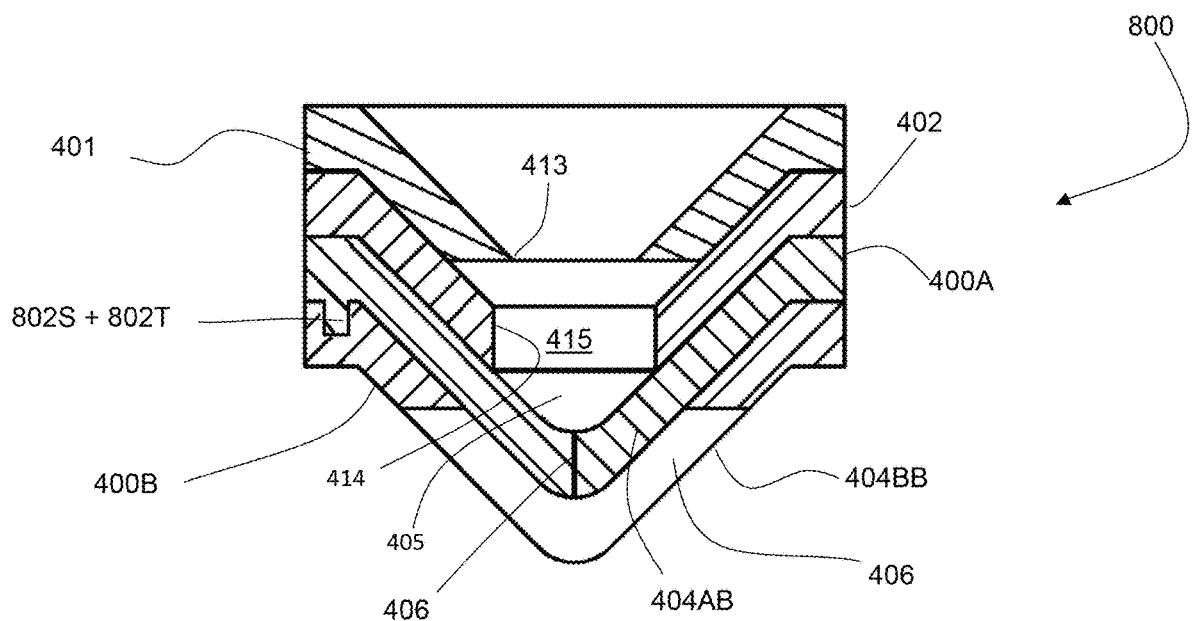
FIG. 8B is a cross-sectional view of the four-member stack of FIG. 8A.

FIG. 8A and 8B show a four-member valve stack 800 including a diaphragm 401, an anti-prolapse component 402, and a pair of single-seam gasket seals 400A, 400B with the seams oriented at 90° to each other. The seams are not visible in FIG. 8A, but are shown in FIG. 8B. The seams 406 of both seals 400A, 400B are shown. The seam 406 of seal 400A is represented by a line because the seam 406 is perpendicular to the page, while seam 406 of seal 400B is illustrated parallel to the page. Since the valve stack 800 is shown in cross-section the visible portion of the seam 406 of seal 400B is the portion that is defined by flap 404BB. A corresponding flap 404AB of seal 400A is shown rotated 90 degrees. Stack 800 is similar to stack 500 except that it includes two seals 400A, 400B with seams 406 turned 90 degrees relative to each other. The angular offset is set by registering structures described previously herein. Specifically, seal 400A has a socket 802S that receives a corresponding tab 808T of seal 404B. Optionally, the seals may be structurally identical by placing the socket 802S on the upstream face of the flange 302, and the tab 802T on the downstream face of the flange 302, where one registering structure is parallel to the seam 406 and the other is 90 degrees from the seam 406. FIG. 8B illustrates such an arrangement, specifically showing the socket 802S receiving the tab 802T at reference numeral 802S+802T. The socket 802S of seal 400A is out of view in this cross section, as is the tab 802T of seal 400B.

Figure 9:
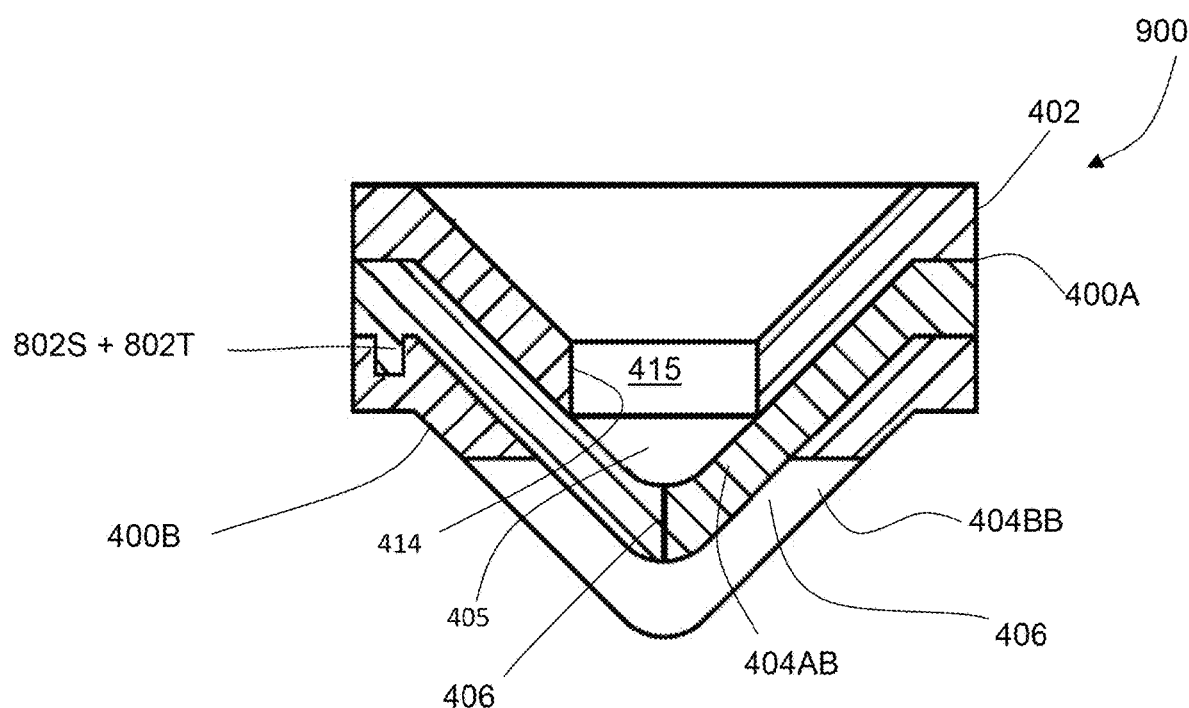
FIG. 9 is a cross-sectional view of a three-member stack having two conical seals but no diaphragm.

FIG. 9 shows a three-member valve stack 900 embodiment comprising a pair of single-seam gasket seals 400A, 400B with the seams 406 oriented at 90o to each other, and an anti-prolapse member 402. This stack 900 is similar to stack 800 except that it omits the diaphragm 401. The diaphragm 401 is optional, but may be advantageous for limiting backflow of fluids.

It will be apparent to those skilled in the art that the above methods and apparatuses may be changed or modified without departing from the general scope of the invention. The invention is intended to include all such modifications and alterations insofar as they come within the scope of the appended claims or the equivalents thereof.

Having thus described the invention, it is now claimed:

1. A seal for a hemostasis valve comprising,
an anti-prolapse member comprising a rigid frustoconical structure having an annular base flange and a central through-hole;
a first sealing member comprising a flexible conical structure having an annular base flange, a blunted apex axially aligned with the through-hole of the anti-prolapse member, a seam oriented through the blunted apex of the first sealing member, a first registering structure at a first position on an upstream face of the base flange of the first sealing member, and a second registering structure complementary to the first registering structure of the first sealing member and positioned on a downstream face of the base flange of the first sealing member at an angular offset of φ relative to the first registering structure of the first sealing member, wherein φ is an angle between 10° and 90°, wherein an upstream face of the first sealing member receives a downstream face of the anti-prolapse member; and
a second sealing member comprising a flexible conical structure having an annular base flange, a blunted apex axially aligned with the through-hole of the anti-prolapse member, a seam oriented through the blunted apex of the second sealing member, a first registering structure at a first position on an upstream face of the base flange of the second sealing member, and a second registering structure complementary to the first registering structure of the second sealing member and positioned on a downstream face the base flange of the second sealing member at an angular offset of φ relative to the first registering structure of the second sealing member, wherein φ is an angle between 10° and 90°, wherein an upstream face of the second sealing member receives a downstream face of the first sealing member, and wherein the second sealing member is oriented at an angular offset of φ relative to the first sealing member.

2. The seal of claim 1, wherein φ is an angle between 10° and 20°, 20° and 30°, 30° and 40°, 40° and 50°, 50° and 60°, 60° and 70°, 70° and 80°, or 80° and 90°.

3. The seal of claim 1, further comprising a diaphragm, that is flexible and frustoconical, having an annular base flange and a central through-hole, wherein a downstream face of the diaphragm is received by an upstream face of the anti-prolapse member.

4. A seal for a hemostasis valve comprising:
an anti-prolapse member comprising a rigid frustoconical structure having a conical wall, an annular base flange at a base of the conical wall of the anti-prolapse member, and a central through-hole in the conical wall of the anti-prolapse member;
a diaphragm, that is flexible and frustoconical, having a conical wall, an annular base flange at a base of the conical wall of the diaphragm, and a central through-hole in the conical wall of the diaphragm, wherein a downstream face of the conical wall of the diaphragm is received by an upstream face of the conical wall of the anti-prolapse member; and
a sealing member comprising a flexible conical structure having a conical wall, an annular base flange at a base of the conical wall of the sealing member, a blunted apex axially aligned with the through-hole of the anti-prolapse member and the through-hole of the diaphragm, a seam oriented through the blunted apex, wherein an upstream face of the conical wall of the sealing member receives a downstream face of the conical wall of the anti-prolapse member.

5. A hemostasis valve, comprising:
a valve body comprising an inner luminal wall defining a lumen extending from an upstream opening to a downstream opening;
a seal stack comprising:

an anti-prolapse member comprising a rigid frustoconical structure having a conical wall, an annular base flange at a base of the conical wall of the anti-prolapse member, and a central through-hole in the conical wall of the anti-prolapse member;

a sealing member comprising a flexible conical structure having a conical wall, an annular base flange at a base of the conical wall of the sealing member, a blunted apex axially aligned with the through-hole of the anti-prolapse member, a seam oriented through the blunted apex, wherein an upstream face of the conical wall of the sealing member receives a downstream face of the conical wall of the anti-prolapse member;

a mounting groove in the inner luminal wall sized to simultaneously receive the base flanges of the seal stack in a mounted relation; and a frustoconical valve seat supportively receiving a downstream face of the seal stack, the frustoconical valve seat defining an orifice in fluid communication with the lumen of the valve body, wherein the blunted apex of the seal stack protrudes through the orifice.

6. The hemostasis valve of claim 5, wherein the inner luminal wall is an inner luminal wall of the valve body further comprising a pressure transducer in pressure communication with a lumen defined by the inner luminal wall of the valve body.

7. The hemostasis valve of claim 5, further comprising a diaphragm, that is flexible and frustoconical, having a conical wall, an annular base flange at a base of the conical wall of the diaphragm, and a central through-hole in the conical wall of the diaphragm, wherein a downstream face of the conical wall of the diaphragm is received by an upstream face of the conical wall of the anti-prolapse member.

8. The hemostasis valve of claim 5, further comprising a cylindrical seal disposed upstream of the seal stack, wherein a central through-hole of the cylindrical seal is aligned and in fluid communication with the lumen of the valve body.

9. The hemostasis valve of claim 8, further comprising a threaded compression fitting in axially compressive communication with the cylindrical seal such that compression of the cylindrical seal is controllable through turning the threaded compression fitting.

10. The hemostasis valve of claim 9, wherein the central through-hole of the cylindrical seal is sized to slidably receive a catheter in an uncompressed state, and to lockably receive a catheter in a compressed state.

11. The hemostasis valve of claim 10, further comprising a threaded mount for fixedly cooperating with cannulas.

12. The hemostasis valve of claim 11, further comprising a sidearm in communication with the lumen of the valve body downstream of the seal stack.

13. The hemostasis valve of claim 12, further comprising a pressure transducer in pressure communication with a lumen defined by the inner luminal wall of the sidearm.

\* \* \* \* \*